…

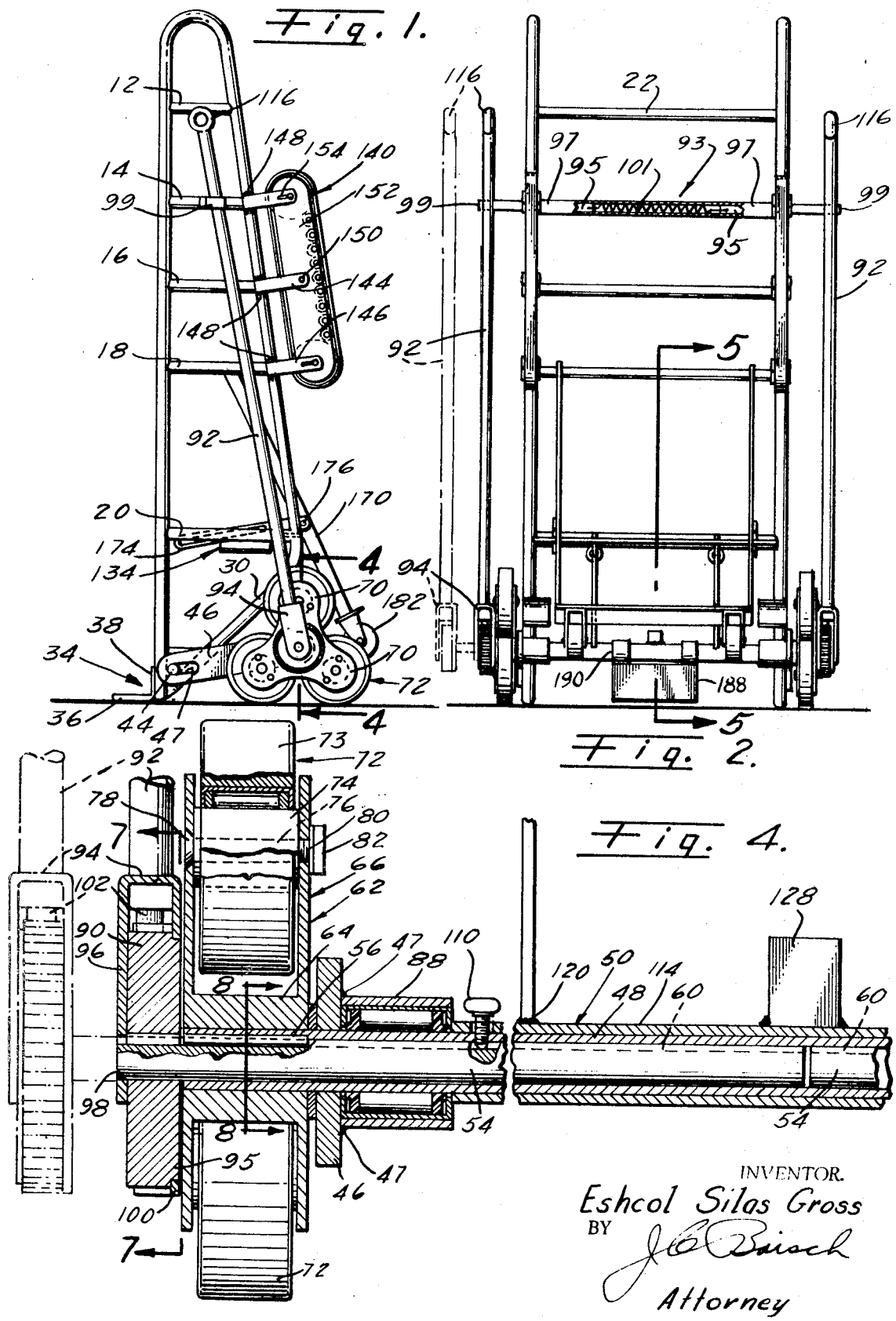

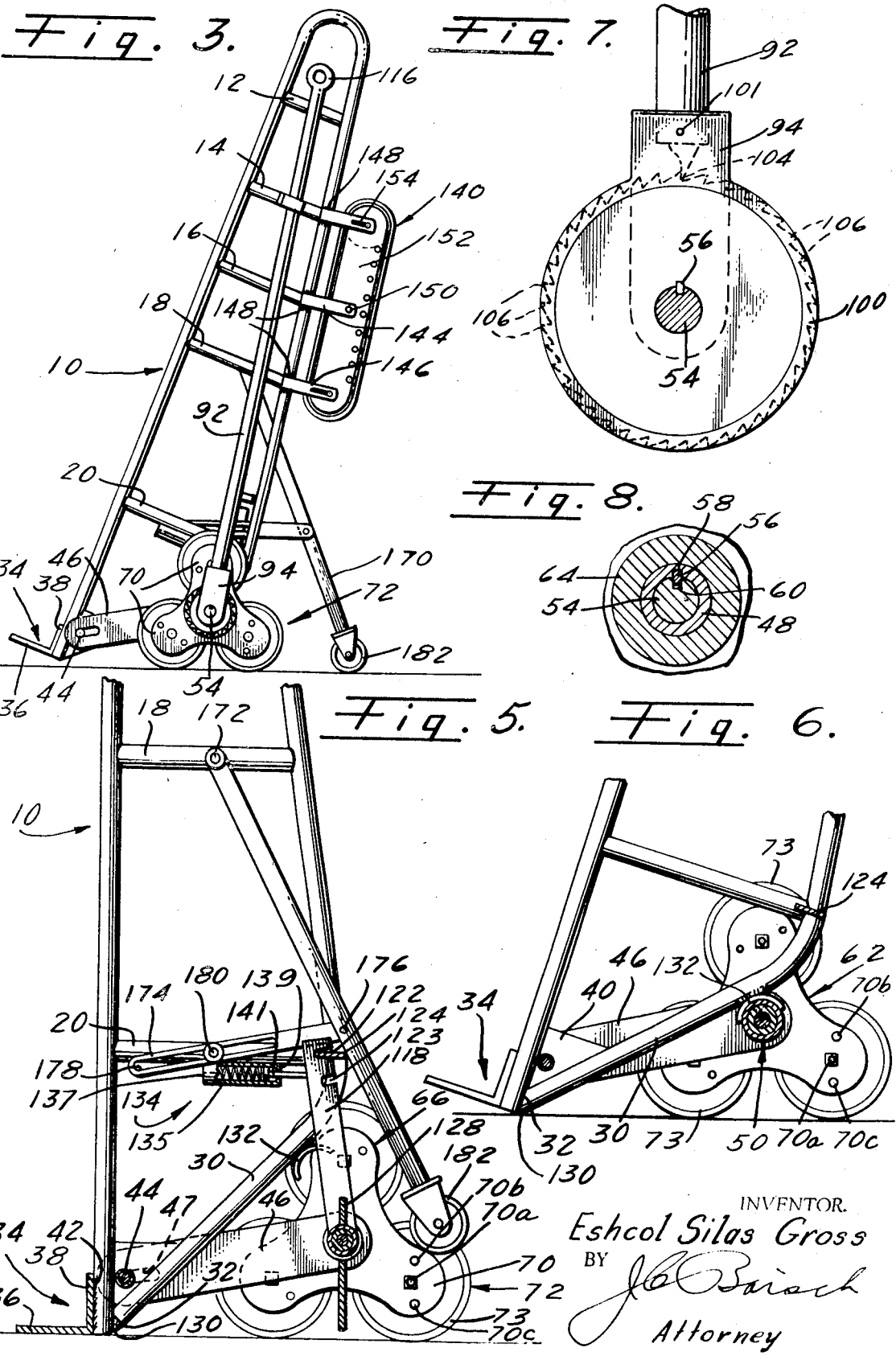

United States Patent Office 3,515,401
Patented June 2, 1970

3,515,401
STAIR CLIMBING DOLLY
Eshcol S. Gross, 1110 N. Tyler,
El Monte, Calif. 91733
Filed Nov. 6, 1968, Ser. No. 773,921
Int. Cl. B62b 5/02
U.S. Cl. 280—5.26
9 Claims

ABSTRACT OF THE DISCLOSURE

An apparatus for manually moving heavy objects up stairways. A group of wheels at each side are arranged about a common axis and are manually moved about said axis by levers successively from step to step of the stairway and one way clutch bearings permit forward rotation of the groups of wheels about said axis but prevent reverse rotation of said wheels. A tilting mechanism facilitates loading of a piece of equipment on the apparatus.

BACKGROUND OF THE INVENTION

Field of the invention

This invention relates generally to moving equipment and relates more particularly to hand dollies or hand trucks for moving heavy articles or appliances such as refrigerators, furniture and the like up stairways.

Description of the prior art

There are various types of manual appliance handling dollies and trucks. Several difficulties are encountered with these devices, especially when trying to move heavy objects and articles up stairways.

One difficulty is that on stairways with a heavy load not enough men can get around such devices to get it up the stairs.

Another difficulty is that with the prior art apparatus of devices the weight is primarily on the front or free edge of the steps which are therefore apt to be broken off.

There is also danger such prior art devices with a heavy load will get out of control and roll back.

BRIEF SUMMARY OF THE INVENTION

The present invention comprises a frame with oppositely disposed side frame members secured together by cross members. At the lower end of the frame is a transversely extending axle assembly which comprises an intermediate axle tube in which a pair of oppositely arranged inner axles are slidably disposed in keyed relation to the intermediate axle tube. An outer axle tube receives the intermediate axle tube which is rotatable in said outer axle tube, the inner axles rotate with the intermediate axle tube.

There are clutch bearings for the intermediate axle tube connected to said axle tube and to the outer axle tube, said clutch bearings permitting rotation of the intermediate axle tube in one direction but preventing counter rotation thereof.

Wheel supports are secured to the outer ends of the intermediate axle, said wheel supports each having three arms spaced annularly apart equal distances. There is a wheel rotatably mounted on each arm, there being a clutch bearing for each wheel and said clutch bearings are so arranged that their respective wheels may rotate in one direction but are prevented from counter rotation.

Ratchet mechanisms are provided at each end of the inner axles for rotating same to effect stair climbing of the apparatus.

Endless tracks are mounted on the frame and provide stair glides that ride on the front or free edges of the steps of stairs when the apparatus is climbing stairways.

OBJECTS AND ADVANTAGES OF THE INVENTION

It is an object of the invention to provide manually operated apparatus for moving heavy appliances and other pieces of equipment up stairways.

Another object of the invention is to provide apparatus of this character which may be readily operated by a single person.

Still another object of the invention is to provide apparatus of this character whereby heavy equipment and the like may be safely moved up stairways.

A further object of the invention is to provide apparatus of this character having means for facilitating loading of equipment, appliances and the like on said apparatus.

A still further object of the invention is to provide apparatus of this character that is simple in construction, relatively easy to operate, and that is rugged and reliable.

The characteristics and advantages of the invention are further sufficiently referred to in connection with the following detailed description of the accompanying drawings which represent one embodiment. After considering this example skilled persons will understand that many variations may be made without departing from the principles disclosed and I contemplate the employment of any structures, arrangements or modes of operation that are properly within the scope of the appended claims.

Referring to the drawings, which are for illustrative purposes only:

FIG. 1 is a side elevational view of apparatus embodying the invention in an upright position;

FIG. 2 is a rear elevational view thereof;

FIG. 3 is a side elevational view of the apparatus with the frame supported in a rearwardly tilted position;

FIG. 4 is an enlarged sectional view taken on line 4—4 of FIG. 1;

FIG. 5 is an enlarged side elevational view of the lower part of the apparatus positioned as in FIG. 1;

FIG. 6 is an enlarged side elevational view of the lower part of the apparatus positioned as shown in FIG. 3;

FIG. 7 is a sectional view taken on line 7—7 in FIG. 4; and

FIG. 8 is a sectional view taken on line 8—8 of FIG. 4.

Referring more particularly to the drawings, the apparatus comprises a frame each side, indicated generally at 10, of which is in the shape of an elongated, narrow, inverted U which is narrower at the top than at the bottom. Reinforcing cross members 12, 14, 16, 18, and 20 extend between the arms of each U-frame part 10 in longitudinally spaced relation thereof, the ends of said reinforcing cross members being secured to the respective arms of the U-frame part by means of welding, brazing, or the like.

There are also transverse reinforcing members 22, 24, and 26 interconnecting said U-frame parts 10, said transverse reinforcing members having their ends welded or otherwise suitably secured to corresponding arms of the U-frame parts.

The rear arms of the U-frame parts have portions 30 which are inclined forwardly and downwardly, the forward ends of which are secured to the lower ends of the forward arms as indicated at 32, by means of welding, brazing, or other suitable means.

A support for items being handled is indicated generally at 34 and is attached to the lower end of the front arms of the U-frame parts, said blade comprising an angle iron having a forwardly projecting blade 36, the other part of the angle iron, indicated at 38 is secured to the forward sides of the forward arms of the U-frame parts by welding, brazing, or other suitable means.

Pivot support plates 40 are secured to the lower ends of the U-frame parts by welding or other suitable means and are located at the outer sides of said U-frame parts. Suitable pivots 44 are secured to the respective plates 40, the forward ends of links 46 having slots 47 in which said pivots 44 are received so that said forward ends of links 46 are pivotally mounted. These slots provide a certain amount of lost motion when the frame is tilted as described hereinafter. The opposite ends of said links 46 are pivotally mounted on the intermediate axle tube 48 of an axle assembly best shown in FIG. 4 and indicated generally at 50.

Within the intermediate tube 48 are oppositely arranged inner axles 54, said inner axles being longitudinally slidable in the intermediate tube 48 and are keyed to said intermediate tube by means of respective keys 56 which are disposed in longitudinally extending keyways 58 within the intermediate tube, there being keyways 60 in the inner axles 54 in which the keys 56 are slidably received.

On the outer ends of the intermediate axle are wheel support frames, indicated generally at 62, which have a hub 64 and side plates integral with the hub and indicated generally at 66. The side plates of each wheel support frame are spaced apart and said side plates have correspondingly arranged arms 70 between which are operably mounted wheels, indicated generally at 72 and which have rubber tires 73 thereon. There are three arms for each side plate of each wheel frame and three wheels for each frame, said wheels being annularly spaced apart.

There are clutch bearings 74 operably mounted on shafts 76 received in aligned openings provided therefor in corresponding arms 70 of the wheel frame. These shafts have heads 78 at one end and are threaded at the opposite end as at 80 for reception of nuts 82 for securing the shafts in position. The clutch bearings are of well known character. These bearings are so arranged that the wheels 72 will rotate in one direction but are prevented from counter rotation.

The hub 64 has an axial opening therethrough in which is received an outer end portion of the intermediate tube 48 and to which the wheel support frames 62 are secured by welding so that the wheel support frame and the intermediate tube will rotate together.

At the inner side of each of the links 46 is a clutch bearing 88 operably connected to the adjacent link 46 by any suitable means such as welding or the like, for example. The intermediate tube 48 is operably disposed in said bearing 88 so that the intermediate tube can rotate in one direction, forwardly, and is prevented from counter rotation.

At the outer end of each inner axle 54 a ratchet wheel 90 is secured by means of a suitable pin, not shown, so that rotation of the ratchet wheel will effect rotation of the respective inner axle and hence the intermediate tube.

Means for rotating the ratchet wheels comprise respective levers 92 each having a yoke 94 attached thereto by any suitable means with the outer arm 96 having a hole 98 therein for reception of an outer end portion of the respective inner axle. The opposite arm 100 of the yoke 94 has a hole therein for reception of a reduced diameter part 95 at the inner side of the ratchet wheel 90. The end of the lever to which the yoke is attached is open and there is pivotally disposed on a pivot 101 a pawl 102 of well known character and having a pointed outer end 104 receivable in the spaces between the teeth 106 of the ratchet wheel 90. The shape of the outer end of the pawl and the angle of the teeth is of the usual character so that the pawl will slide over the teeth when moved in one direction but will enter between adjacent teeth when actuated in the opposite direction and be held in said position by an abutment, not shown, so as to provide an operable connection between the lever 92 and the ratchet wheel whereby the latter is rotated with rotation of the lever in said opposite direction. There is, of course, a spring, not shown within the lever which acts on the pawl to yieldingly urge the pawl in one direction to permit it to pass over the teeth 106 of the ratchet wheel. This mechanism is of well known character.

Each of the inner axles is slidable within the intermediate lever so that the ratchet mechanism, including the ratchet wheel and lever 92 may be moved outwardly and inwardly to adjust its position as desired to accommodate objects of various sizes on the dolly. The adjusted position of each ratchet mechanism is secured by means of a wing screw 110 disposed in a tapped opening provided therefor in the intermediate tube 48 adjacent to the respective clutch bearings 88 but spaced inwardly thereof sufficiently to permit actuating of the wing screws to loosen and tighten same. Tightening the screws causes their inner ends to engage the respective inner axles and secure them in longitudinally adjusted positions. It is to be noted that the adjacent ends of an outer tube or axle sleeve 114 are spaced from the adjacent clutch bearings but abut the adjacent wing screw so that the axles sleeve 114 is restrained against longitudinal displacement.

At the upper end the levers 92 are provided with eyes 116 so that ropes may be attached thereto for working said levers from the front of the apparatus, that is from the front relative to the direction of movement. The levers are pulled forwardly sufficiently to move the wheels from one step to the next and the levers will then move in the rearward direction by gravity.

When the dolly is in the upright position, as best shown in FIGS. 1 and 5 the blade 36 rests on the floor so that an appliance or other item may be easily moved thereonto. Latch members 118 retain it in this position while it is being loaded, said latch members having their lower ends welded, as at 120, or otherwise suitably secured to the outer sleeve 114 of the axle assembly and said latch members are provided with notches 122 in which is received a cross member 124 the ends of which are welded at 126 or otherwise suitably secured to corresponding arms of the side frame members. A pedal 128 is welded or otherwise suitably secured to the outer sleeve 114 and when said pedal is pushed forwardly by the operator's foot the latch members are rotated forwardly to release the frame so that the upper end may be pulled rearwardly and will pivot on the lower end of the forward arms of the side frame, the fulcrum point being at 130.

The rearward rotation of the frame is limited by engagement of members 132 engaging the clutch bearings 88, said members 132 being arcuate in cross section and secured to the rear arms of the side frame members by welding or other suitable means. After the members 132 engage the bearings 88 the frame pivots on said bearings so that the load may be raised from the floor.

The latch members 118 are returned to their latching position by means, indicated generally at 134, each of which comprises a casing 135 attached to an adjacent cross member 20. The casing 135 is provided with end walls 137 and 139, the latter having a plunger opening for slidable reception of a plunger 141 which has a head at the inner end. A spring 113 is disposed in the casing and reacts between end wall 137 and the plunger head. The outer end of the plunger engages adjacent latch member 118 and the spring urges the plunger to position the latch member in its latching position, the head of plunger 141 limiting spring urged movement of said plunger.

When the dolly is tilted back, as shown in FIG. 3, the latch member notches 123 receive the cross member 124 to retain the dolly in said tilted back position.

It is to be understood, of course, that when the appliance or other load is moved onto the blade 36 it is secured to the frame by means of the usual mechanism which includes an automatic retractable belt with automatic ratched assembly for tightening the belt around the object on the dolly. This mechanism is well known and is incorporated in the dolly but since it is not part of the present invention, except as a means for securing the object on the dolly, it is not shown.

Stair glides, indicated generally at 140, are provided at the rear side of each side frame and comprise a plurality of pairs of support arms 142, 144 and 146 having their forward ends secured to adjacent rear arms of the side frames 10 by any suitable means such as welding 148 or the like. The arms of each pair are secured to opposite sides of said rear arms of frames 10 so the arms of each pair are laterally spaced apart. The free ends of the center arms 144 have aligned holes therein for reception of a pivot 150 for pivotally carrying belt supporting means which includes a pair of plates 152 spaced laterally apart and disposed between pairs of arms 142, 144 and 146.

The support arms 142 and 146 have slots 154 in their ends for reception of transverse pins 158 secured in openings provided therefor in said plates 152 so that said plates may have limited rocking movement on the pivot 150, said plates being spaced from the adjacent rear art of the respective side frames.

Plates 152 also have a plurality of rollers 160 operably mounted therebetween and spaced apart along their rear edges, said rollers extending outwardly or rearwardly of said rear edges of the plates 152. There are also large pulleys 164 between said plates and at the ends thereof, and a belt 166 is operably disposed on said pulleys and said rollers. This belt may be of rubber or other suitable material and the mechanism is adapted to ride over the free edges of the steps or stairways when the dolly is carrying an object upstairs. The middle arms 144 support the plates 152 and said plates rock on the pivot 150 as the dolly is moved up the stairway.

Means is also provided to retain the dolly in an upright position after it has been tilted rearwardly to a position whereat the members 132 rest on the respective clutch bearings 88. This means comprises brace members 170, one at each side. The upper ends of said brace members are pivotally mounted by means of pivots 172 to cross members 18 of the side frames. Links 174 have their rear ends pivoted, at 176, to respective brace member, said links having elongated slots 178 screws 180 threadably received in tapped bores provided therefor in cross members 20. With this arrangement the screws may be loosened and the braces swung rearwardly to the desired position whereupon the screws are tightened. A roller or castor 182 is provided at the lower free end of each brace member and rests on the floor when the dolly is tilted rearwardly. These brace members and their castors 182 also serve as means for moving the dolly downstairs.

When not in use the brace members are held in a forward position, as shown in FIG. 5, the screws 180 being loosened to permit moving the brace members to their inoperative position whereupon said screws are tightened to retain the brace members in their inoperative position.

It is to be noted that each of the arms 70 of the wheel support has a plurality of wheel axle openings or holes indicated at 70a, 70b and 70c. The pivots or axles 76 of the wheels 72 are shown as being disposed in the holes 70a. The other holes 70b and 70c are variably spaced from the axis of the wheel support frames 62 so that the wheels may be variably positioned relative to the axis of said wheel support frames to accommodate to various stairways. That is the various spacing of the wheels from the axis of the axle assembly provides for adjustment of the wheels according to the height of the steps of the stairway to be climbed.

When the device is climbing a stairway the free edges of the stairs is cleared by the wheel support frames due to the arcuate relief 186 of the side plates 66 between the arms 70 of the wheel support frames.

Levers 92 are held in inoperative position when not in use by means indicated generally at 93 which includes a pair of oppositely arranged rods 95 which slide laterally of the frame in brackets 97 secured to respective cross members 14 of the side frames by welding or other suitable means. The outer ends of said rods have hooks 99 for hooking onto the respective levers 92. The inner ends of said rods are spaced apart and urged inwardly by a spring 101. When not in use the rods are limited in their inward spring urged movement by engagement with adjacent frame parts so that they are out of the way.

In operation the object to be moved upstairs is placed on the blade 36 and secured by means of the above referred to retractable belt with automatic ratchet assembly.

The dolly is then tilted rearwardly as above described and rolled on the wheels 72 to the stairway. It is then further tilted until the stair glides rest on the edges of the steps. The levers 92 are then actuated to rotate the ratchet wheels to rotate the wheel support frames so that the wheels will successively be moved from step to step.

A safety device is also provided and comprises a plate 188 freely pivoted on the outer axle sleeve 114 by means of bands 190, said plate being maintained substantially vertical by gravity. As the dolly moves upward this safety plate 188 moves to a position whereat it will engage the adjacent steps should any slipping back occur and thus the dolly quickly held in position.

Inasmuch as the steps of stairways vary as to height, each set of arms 70 have aligned openings.

It is to be understood that ordinary bearings may be used throughout. However, the clutch bearings provide a safety factor that is very important.

I claim:

1. A stair climbing hand dolly, comprising:
   (A) an elongated frame;
   (B) a blade secured to the lower front part of said frame;
   (C) a link at each side of said frame and pivotally connected to said frame adjacent the lower front part thereof to provide a fulcrum for said frame, said links extending rearwardly and having openings adjacent their rear ends;
   (D) an axle assembly including a rotatable intermediate axle tube having end portions operably disposed in the holes in said links;
   (E) a wheel support frame at each end of said axle assembly, said wheel support frames having hubs with an opening therethrough in which end portions of the intermediate axle tube are received and on which said wheel support frames are secured for rotation with said intermediate axle tube, each of said wheel support frames having side plates with a plurality of radially extending oppositely disposed arms spaced laterally apart in pairs;
   (F) shafts operably disposed in aligned openings in each of said pairs of arms, said shafts extending between the arms of respective pairs;
   (G) wheels operably carried by said shafts;
   (H) ratchet means for rotating said wheel support frames on their axes and hence said wheels about the axes of said wheel support frames;
   (I) a one way clutch means operably secured to each link and in which portions of said intermediate axle tube is operably received, said clutch means permitting rotation of said intermediate axle tube in one direction but preventing rotation thereof in the opposite direction;
   (J) said frame being adapted to be tilted between an upright position and a rearwardly inclined position and vice versa on said fulcrum of the dolly;
   (K) and means for limiting rearward tilting of said frame on said fulcrum.

2. The invention defined by claim 1, including endless track stair glides at the rear of the frame and at opposite sides thereof for riding on the free edges of steps of stairways up which the dolly travels.

3. The invention defined by claim 2, wherein the wheel support frames each have three pairs of arms and there is a one way clutch bearing on each shaft with the respective wheels operably carried by said clutch bearings.

4. The invention defined by claim 3, including brace means pivotally mounted to the frame and movable between an inoperative position and a rearward position whereat the braces will brace the frame after it has been tilted beyond the position whereat the means for limiting rearward tilting on the fulcrum and said fulcrum has been raised; roller means at the lower free end of each brace; and releasable securing means for releasably securing said braces in various positions.

5. The invention defined by claim 3, wherein there is a keyway within end portions of the intermediate axle tube, a key secured in said keyway, a pair of inner axles in said intermediate axle tube with end portions extending outwardly of the ends of said intermediate axle tube, said inner axles having keyways therein for slidable reception of respective keys so that said inner axles are slidable in the intermediate axle tube but rotation of said inner axles will effect rotation of said intermediate axle tube; a ratchet wheel secured to the outer end of each of the inner axles, said ratchet wheels having peripheral ratchet teeth; a handle rotatably mounted on said ratchet wheel; and a pawl for each handle, said pawls being operably carried by respective levers for engaging the teeth of said ratchet wheels when said levers are actuated in one direction for rotating said ratchet wheels, said pawls slipping over said teeth when the levers are actuated in the opposite direction.

6. The invention defined by claim 5, including releasable means for securing the inner axles in longitudinally adjusted position.

7. The invention defined by claim 5, including releasable means for securing the handles in an inoperative position.

8. The invention defined by claim 1, including an outer axle sleeve rotatably mounted on the intermediate axle tube, latching means attached to said outer axle sleeve for latching the frame in either the upright position or the tilted position, means for yieldingly positioning the latching means in the latching position; and pedal means secured to said outer axle sleeve for rotating same and moving the latching means to a release position.

9. The invention defined by claim 8, including a plate, and means rotatably mounting said plate loosely on the outer axle sleeve whereby gravity will urge said plate to a substantially vertical position.

References Cited

UNITED STATES PATENTS

| | | | |
|---|---|---|---|
| 2,633,363 | 3/1953 | Marshall | 280—5.26 |
| 2,736,564 | 2/1956 | Loam et al. | 280—5.26 |
| 3,178,193 | 4/1965 | Grogan | 280—5.26 |
| 3,346,269 | 10/1967 | Soto | 280—5.26 |
| 3,450,219 | 6/1969 | Fleming | 280—5.26 X |

FOREIGN PATENTS 1,032,136   6/1966   Great Britain.

LEO FRIAGLIA, Primary Examiner

180—8

U.S. Cl. X.R.